Dec. 25, 1945. H. CRUZAN ET AL 2,391,551
BY-PASS CONTROL VALVE
Filed Jan. 8, 1943
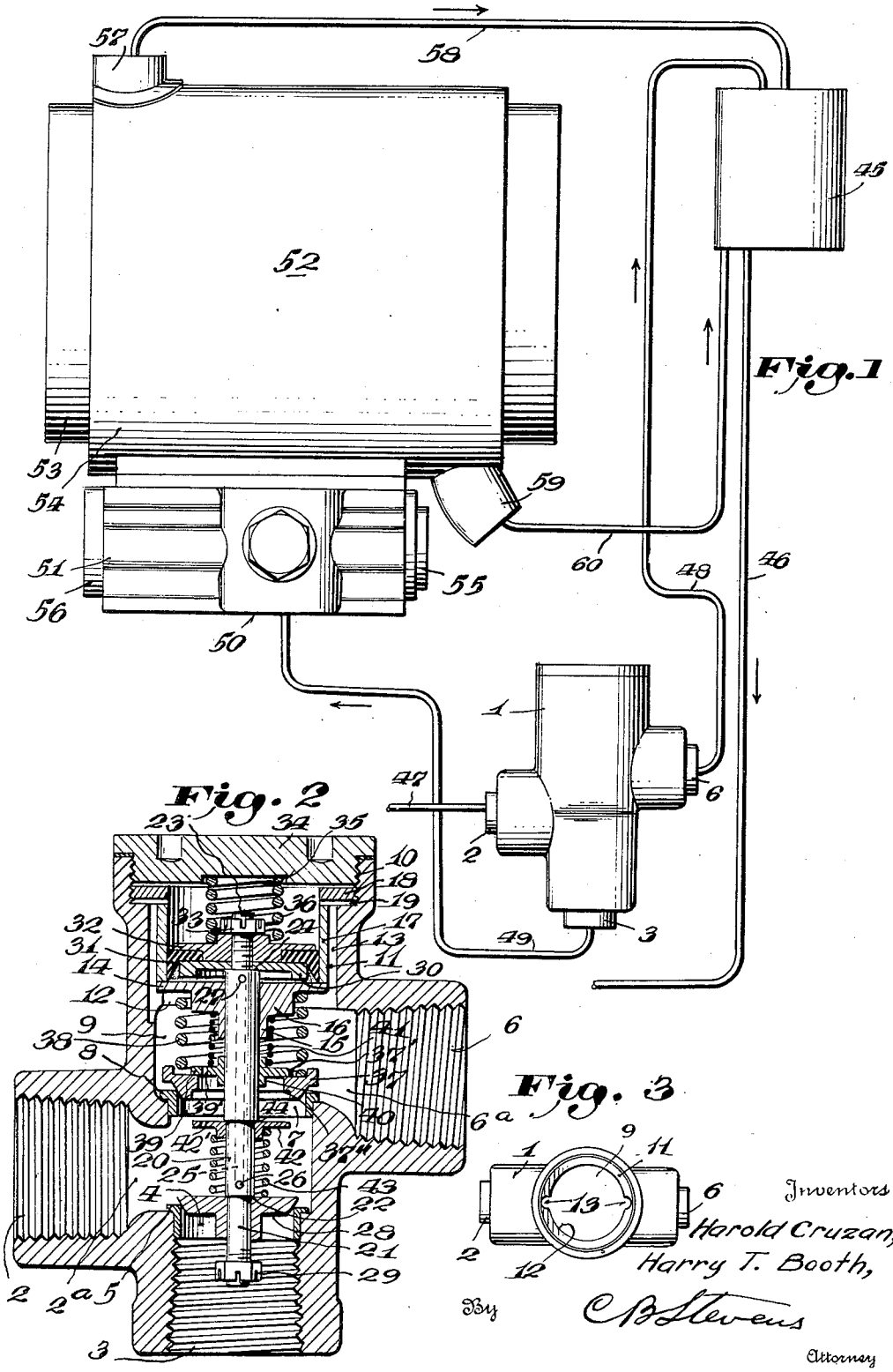
Inventors
Harold Cruzan,
Harry T. Booth,
By C. B. Stevens
Attorney Patented Dec. 25, 1945

2,391,551

UNITED STATES PATENT OFFICE 2,391,551

BY-PASS CONTROL VALVE

Harold Cruzan, Dayton, Ohio, and Harry T. Booth, Glencoe, Ill.; said Cruzan assignor to United Aircraft Products, Inc., Dayton, Ohio, a corporation of Ohio Application January 8, 1943, Serial No. 471,716

20 Claims. (Cl. 137—153)

This invention relates to a by-pass fluid flow control valve, and pertains more particularly to a device for controlling surge pressures in a fluid circulatory system, such as shown in prior application of Harold Cruzan, Serial No. 445,601, filed June 3, 1942, wherein a lubricant is circulated under pressure through a heat exchanger or temperature and/or viscosity conditioning unit of any suitable type, by a pump or analogous pressure producing means.

While the control valve is hereinafter shown and described as being applied to a lubricant circulating and conditioning system of an airplane engine it will be readily apparent and understood that same is not restricted to such use, but is equally applicable to similar power units when used in connection with fluid circulatory systems wherein a similar problem is involved.

The lubricant circulating and conditioning systems in use with airplane engines at the present time, generally include a pressure pump disposed in the line leading from an oil reservoir to the engine and a scavenge pump and heat exchange unit in the return line from the engine back to the reservoir. The scavenge pump is located ahead of the heat exchange unit so that the latter functions to control the temperature and thereby the viscosity of the oil being returned to the reservoir and thence to the engine.

Ordinarily, when the engine is initially started, the lubricant in the various conduits and heat exchange unit is usually more viscous than desired for efficient operation of the lubricant system. Consequently, high pressure is needed to force the lubricant from the engine, through the flow lines and heat exchange unit to the reservoir or tank. Thus it will be appreciated, that under the foregoing conditions, an almost instantaneous high pressure on the oil lines and heat exchange unit will result immediately upon starting the engine and scavenge pump with consequent damage to the system and heat exchange unit by bulging or collapsing the shell and/or tubes of the latter or rupturing the lines.

Therefore, the primary important object of this invention is to provide a device of the above character which will entirely eliminate the possibility of excessive or surge pressure, generated by the scavenge pump, being exerted on the heat exchange unit so as to protect the latter from damage which may result therefrom.

Another important object of this invention is to provide an automatic valve of the above character which will prevent damage to the lubricating system resulting from excessive pressure built up by the scavenge pump under actual flight conditions, for example in situations where the motor and thereby the lubricating system are temporarily cut out and then restarted at high altitudes or in power dives, such conditions usually resulting in rapidly increasing the viscosity of the lubricant, and in some instances congealing the latter.

Another important object of this invention is to provide a control of the above character which will automatically function to by-pass the lubricant around the heat exchange unit directly to the reservoir in the event the viscosity of the lubricant is such that same will not readily flow through the heat exchanger to the reservoir under the normal pressure generated by the scavenge pump.

Another important object of this invention is to provide a control valve of the above character which will automatically function to by-pass the lubricant around the heat exchange unit to the reservoir in the event that the flow is prevented by an obstruction in the heat exchange unit of the circulatory system.

Included with these broader objectives, which are disclosed and attained in the prior, copending application of Cruzan, Serial Number 445,601, filed June 3, 1942, for By-pass control valve, are the more specific objects of providing a control valve structure having a constantly smooth distributive operation and which only acts suddenly in response to sudden surges of pressure, or sudden blocking in the system.

More particularly it is proposed to provide, a control valve having an inlet, a first outlet to the by-pass circuit, and a second or main outlet to the heat-exchanger, and pressure-responsive valves holding the first and second outlets open and closed, respectively, during the warm-up period (when the oil in the heat-exchanger is congealed) and vice-versa during normal running. In this case, a plurality of valves are provided in the by-pass outlet passage, the intent being to bleed a certain minimum of oil through to the outlet at all times, even while the motor is idling, to open the by-pass outlet in response to the pressure of the oil first flowing under substantial pressure, and to close the by-pass outlet passage and open the main outlet passage when the oil is not congealed and the flow pressure has become less. Most important, it is proposed to provide a safety valve structure which will automatically re-open the by-pass outlet if the main outlet, including the heat exchange unit, be blocked so that more than a permissible maximum pressure would be needed for circulation in the heat exchange circulatory system.

At the same time, it is likewise intended to provide a safety valve which ordinarily remains inoperative during normal running, but which will open in response to extreme pressure surges in the line from the scavenge pump.

In this arrangement, it is proposed to provide positive and, above all, smooth and constant operation and response of the various valves, and to ensure correlated action between them. Since the valves are spring-loaded and since a wide range of pressure must be responded to, it is herein proposed to provide separate valve surfaces and separate springs for the various responses contemplated. As the pressures steadily rise and fall, and as congelation increases and decreases, the work of one valve takes up where the other leaves off, thus preventing any sudden changes of pressure in the flow circuit regulating from valve operation except when a sudden surge occurs, or when pressure rises in the main outlet line, and then the by-pass outlet is opened appropriately but quickly.

A still further important object of this invention is to provide a by-pass control valve which is of simple construction, easily and quickly installed, efficient in operation and one which may be readily manufactured and placed upon the market at a reasonable cost.

The foregoing and other important objects and advantages will be readily apparent throughout the course of the following detailed description and drawing, wherein like reference characters indicate like parts, and in which:

Figure 1 is a diagrammatic disclosure of one type of lubrication system with the by-pass control valve forming the subject matter of this application installed therein, and with the engine and pumps removed.

Figure 2 is a vertical cross-section of the by-pass control valve shown in elevation in Figure 1, and Figure 3 is a top plan view of the control valve on a reduced scale, with the closure and valve mechanism removed.

Referring in detail to the by-pass control valve, 1 indicates a hollow body or casing of substantially cruciform configuration, provided with an inlet port 2, the inner end of which leads to an inlet chamber 2a, and a main outlet port 3 connected by a right-angled passage 4 through chamber 2a having a valve seat 5 therein. The body 1 is also provided with a by-pass outlet port 6 having an outlet chamber 6a at the inner end connected with the inlet port 2 by a passage 7 having a valve seat 8 therein disposed in axial alinement with the valve seat 5.

The hollow body 1 is further formed with a vertically extending branch passage 9 in axial alinement with the valve seats 5 and 8 and has its open upper end internally threaded as at 10.

The passage 9 above the by-pass outlet 6 is reduced as at 11 and such reduced portion is formed at its lower end with an inwardly extending flange 12. The reduced portion and the flange are further formed with diametrically opposed and vertically extending grooves 13 to provide a pair of fluid flow passages.

Disposed within the reduced portion 11 and engaging the flange 12, so as to be supported thereby, is a disk 14 having a central opening therethrough. Formed integral with the disk and depending therefrom in axial alinement with the central opening, is a sleeve 15, the inner and outer surfaces of which latter provide bearings or guides. Adjacent its upper end at the point of connection with the disk 14, the sleeve 15 is formed with an enlargement or collar 16.

Fitting snugly within the reduced portion 11, is a cylinder 17 which has its lower end seated upon the disk 14 and its upper end terminating substantially flush with the upper end of said reduced portion, the disk 14 forming a bottom for the cylinder.

A locking ring 18 is threaded into the upper end of the branch passage 9 and has its lower face engaging the upper end of the cylinder 17 so as to securely hold the disk 14 upon the flange 12. The lower face of the locking ring 18 is provided with a pair of opposed radially extending and downwardly facing grooves 19 to provide horizontal fluid passages connecting the fluid passages 13 with the interior of the cylinder 17.

The rod 20, between the shouldered portions 22 and 24, is formed with an axially extending passage 25, which latter communicates at its lower end with a transverse passage 26 opening into the inlet passage of the valve body while its upper end communicates with a transverse passage 27 opening into the cylinder 17.

Slidably mounted upon the reduced lower end of the rod 20 is a valve 28 which is adapted to engage the seat 5 during certain phases of the operation of the device. The valve 28 is retained against separation from the rod 20 by means of a threaded nut 29, or other suitable fastening means, which also acts to engage and thereby unseat or open valve 28, as will be later described.

Mounted upon the reduced upper end of the rod 20, for reciprocatory movement within the cylinder 17, is a piston head composed of a lower plate 30, an intermediate cup type packing 31, and an upper plate 32, all of which elements are clamped together against the shoulder 24 by means of a nut 33 having threaded engagement with the upper end of said rod.

The upper end of the vertically extending branch passage 9 is sealed by means of a removable cap or closure 34 formed with a downwardly facing recess 35.

A compression spring 36 is disposed between the closure 34 and the upper plate 32 of the piston head with its lower end bearing against the latter and with its upper end seated within and bearing against the top wall of the recess 35, so as to be centered thereby.

An annular upwardly opening ring valve 37 is normally held closed by a compression spring 38 engaged between the recessed upper face 37' thereof and the lower side of disk 14, the collar 16 serving to keep spring 38 in axial alinement with rod 20.

Seated within the upper recessed face 37' of annular ring valve 37 is a smaller valve 39, slidably mounted by a bearing portion 40 on rod 20, the smaller valve being biased downwardly towards closed position by a relatively weak spring 41 engaged between the upper face thereof and the lower surface of shoulder 16. Spring 41 is held in proper axial alinement by being disposed around sleeve 15 at its upper end and around bearing portion 40 at its lower end. Valve 39 has a bleeder opening 39' therethrough for reasons explained hereinafter.

It should be noted particularly that annular valve 37 has on its lower face a second valve seat 37" for receiving a valve 42, having a bleeder opening 42', the valve 42 being slidably mounted on rod 20. A follower spring 43 having its lower end engaged against valve 28 urges valve 42 against a shoulder 44 on rod 20, spring 43 being under compression in the position shown so that valve 42 will move with rod 20. Of the four springs shown, it need only be noted that spring 36 is greater in strength or stored energy than that possessed by spring 43.

Referring to the diagrammatic disclosure of Figure 1, 45 indicates a lubricant or oil reservoir having communication through conduit 46 with a pressure pump and engine respectively, not shown. The oil after leaving the engine is then forced by a scavenge pump not shown, through conduit 47 into the inlet 2 of by-pass control valve body 1.

The by-pass outlet 6 of the valve body 1 is connected to reservoir 45 by conduit 48 while the main outlet port 3 is connected by conduit 49 with the inlet passage 50 of an oil viscosity controlled member 51 carried by an oil heat exchange unit indicated generally at 52, although any suitable type of heat exchanger may be used and regardless of whether the latter is equipped with a viscosity controlled valve or not. The oil heat exchange unit shown in Fig. 1 is provided with a radiator 53 surrounded by a warming jacket 54.

The inlet passage 50 of the viscosity controlled member 51 leads to each of a pair of pressure valves 55 and 56 which control the inlet of oil to the warming jacket and radiator respectively, depending upon the viscosity of oil in the radiator 53.

The radiator 53 is provided with an outlet 57 connected to the reservoir by conduit 58, while the outlet 59 of the warming jacket 54 also communicates with the reservoir through a conduit 60.

The construction and operation of the heat exchange unit and viscosity controlled valve or member 51 per se, forms no part of the present invention except as the same may be included in combination with the system diagrammatically disclosed in Figure 1 of the drawing. However, a brief description of the operation of the heat exchange unit is deemed necessary in order that the operation of the entire system and/or the by-pass control valve, shown in detail in Figure 2 of the drawing, may be fully explained.

Accordingly, the heat exchange unit and parts thereof, not shown in detail, but generally described, functions as follows:

A heat exchange unit of the type described is disposed in the lubricant circulating system between the reservoir and the scavenge pump so that the oil from the engine will be forced through the unit and thence into the reservoir. Assuming that the engine is put in operation from a cold start and that the oil in the radiator 53 is viscous or congealed, same will enter the unit at 50, where it will then be by-passed through valve 55, warming jacket 54, outlet 59 and through conduit 60 into the reservoir.

However, as the viscosity of the oil in the radiator 53 lowers under the influence of the heat transferred thereto from the warming jacket, the valve 55 will close and the valve 56 will open so that the oil entering inlet 50 will follow a path through the radiator 53, outlet 57, conduit 58, and thus into the reservoir 45. This latter circuit or flow path will be maintained so long as the viscosity of the oil is at a point where the latter will readily flow at a predetermined pressure.

Referring to the operation of the entire lubrication system with the by-pass flow control valve included therein ahead of the heat exchange unit, as shown diagrammatically in Figure 1, if the engine is put in operation with the oil in the system and radiator 53 either congealed or in a highly viscous state, the oil from the engine is forced under pressure by the scavenge pump (not shown) through a conduit 47 and inlet 2 of the by-pass control valve.

For describing the operation of the parts within the by-pass control body 1, the conditions of a typical starting sequence will be assumed wherein the motor would be started and either run through an idling, or warm-up period before being opened up for full power output, or opened to full power output immediately.

Assuming the oil in the heat exchange unit and the remainder of the circulatory system, or parts thereof, to be highly viscous or congealed, the pressure necessary to move the oil through the system is correspondingly great, and such pressure is rapidly built up by operation of the scavenge pump. Pressure of the oil at the inlet 2 of the by-pass valve is effective on the upper face of the valve 28 which is normally biased toward closed position by springs 36 and 43 and tends to resist any opening movement of such valve.

Pressure of the oil under the influence of scavenge pump operation opens the valve 39 against the resistance of spring 41 which is relatively weak as compared to spring 38 which holds ring valve 37 in seated or closed position, and oil then flows from inlet 2 past valve 39 to the outlet 6. The fact that the spring 41 which biases the valve 39 toward closed position is relatively weak makes the pressure drop across such valve comparatively low and makes substantially the full inlet oil pressure available to move the congealed oil out of the line 48 from the by-pass outlet 6 of the control valve to the reservoir 45.

Oil pressure at the inlet 2 becomes effective on the under side of the piston composed of parts 30, 31 and 32 through the port 26, passage 25 and port 22, all in the rod 20, it being understood that the passage and ports are preferably of such size that there will be substantially the same pressure on the under side of the piston as there is at the inlet 2, and such pressure on the under side of the piston tends to move the piston and the rod 20 upwardly against the resistance of the spring 36. At the same time, that pressure at the by-pass outlet 6 of the by-pass valve is effective on the upper face of the piston through the passages 13 and 19, and such pressure augments the spring 36 in tending to hold the piston and rod 20 in downwardmost position and the valve 28 closed. However, the strength of the spring 36 is such and the area on which oil pressure is effective are so correlated that the inlet pressure on the under side of the piston will be slightly in excess of combined oil pressure and pressure of the spring 36 on the upper side of the piston, and will be sufficient to permit the piston and rod 20 to be moved upwardly until the nut 29 contacts or substantially contacts the under side of the valve 28, but insufficient to move the piston and rod 20 upwardly and the valve 28 off its seat due to the effect of the inlet oil pressure on the upper surface of the valve 28 plus the downward effect of the spring 36 and the by-pass valve pressure on the upper face of the piston.

Upward movement of the piston and the rod 20 as just described permits the valve 42 to move toward its seat on the lower face of ring valve 37 under the influence of the spring 43 which has the effect of progressively closing off the flow area to and past the valve 39. As such flow area is closed off or restricted, inlet pressure created by the scavenge pump operation again builds up, and while having increased effectiveness on the upper face of the valve 28 to hold such valve closed, moves the combined valves 37 and 39 upwardly as a unit against influence of the springs 38 and 41, the disc valve 42 being held against further upward movement by the shoulder 44 on the rod 20. This has the effect of increasing the pressure drop between the inlet and by-pass oil pressure.

Under conditions as just described, the inlet pressure of the oil is effective on the upper face of the valve 28 to tend to hold such valve closed, and is also effective on the under face of the piston to tend to move such piston and the rod 20 upwardly and pull the valve 28 off its seat. At the same time, upward movement of the piston and rod 20 is resisted by the resistance of the spring 36 and by the by-pass pressure both acting on the upper face of the piston, and the balance is such that the piston and rod 20 will remain in the semi-up position and the valve 28 will remain closed as hereinbefore described pending increase in temperature and reduction in viscosity of the oil and a consequent drop in by-pass line pressure.

As the temperature of the oil increases and the viscosity of the oil lowers by reason of heat imparted to the oil by the engine, the pressure necessary to force the oil through the system and, therefore, the oil pressure in the lines becomes correspondingly less, and when such pressure drops below a predetermined value the oil pressure in the by-pass outlet is no longer sufficient to augment the pressure of spring 36 on the top of the piston and the inlet pressure on top of the valve 28 so as to hold the piston against upward movement under influence of the oil inlet pressure on its under side. At this time, the valve 28 is pulled from its seat and the outlet 3 to the heat exchange unit is opened. The various operating parts of the by-pass control valve are so constructed and arranged that the valve 28 is not opened until the oil pressure in the line is insufficient to have a destructive effect on the heat exchange unit.

Upon opening of the valve 28 the line pressure is exerted on the heat exchange unit, the oil flowing either around the wearing jacket or through the radiator, and as the oil line pressure continues to drop the valves 37 and 39 move to closed position under the influence of springs 38 and 41, with the valve 28 being held in open position by inlet pressure on the under side of the piston in the cylinder 17, and which is great enough to overcome the biasing effects of the springs 36 and 43. Such valves remain in closed position until and unless the pressure in the oil line should exceed the values of the springs 38 and 41 at which time the valves 37, 39 and 42 will be moved upwardly to permit flow to the by-pass. Thus, the pressure to which the heat exchange unit may be subjected is limited to a predetermined value.

The bleeder openings 39' and 42' are provided in the valves 39 and 42 so as to relieve the pressure which may be trapped in the passage connecting the scavenger pump and inlet 2 and main outlet 3, in the event that the cooler is congealed, and with the scavenge not functioning, for example in the case of a false start, thus permitting the by-pass valve parts to return to normal non-operating position.

Until the cooler is warmed up and the inlet pressure drops, the valve 37 maintains the inlet pressure high enough to warm up the cooler, but not high enough to result in damage thereto.

After the cooler has warmed up and valve 37 has closed, a sufficiently high pressure difference between chamber 2a and branch passage 9 and above and below the piston head will be maintained so as to hold valve 28 open until flow is stopped, at which time springs 36 and 43 will reset the entire assembly. The bleeder openings 39' and 42'' in valves 39 and 42 respectively, facilitate such resetting of the mechanism by relieving the pressure, built up in the inlet passage, after the system is at rest. It will be readily apparent from the foregoing that regardless of the type of heat exchange unit used in the lubricating system the by-pass control valve and/or the combination thereof in a lubricant circulatory system, will automatically function to prevent the application of damaging pressure to the heat exchange unit or other part to be protected.

It is to be understood that the form of my invention herewith shown and described, is to be taken as only one example of the same, and that various changes in the shape, size and arrangement of parts may be resorted to without departing from the spirit of my invention or the scope of the subjoined claims.

What is claimed is:

1. In a fluid flow control device, a hollow body having an inlet, a main outlet, and a by-pass outlet, a valve disposed within the body between the inlet and by-pass outlet, a second valve disposed within the body between the inlet and said main outlet, said valves having a pressure responsive action and being normally biased toward closed position, said first valve opening in response to the attainment of a predetermined differential between the pressures at said inlet and said by-pass outlet, means for opening said second valve in response to a predetermined relationship between the inlet and outlet pressures of the fluid passing through the body, movable means for masking the first named valve on the inlet side thereof, and means for moving the movable means to a masking position prior to opening of the second named valve.

2. In a fluid flow control device, a hollow body having an inlet, a main fluid outlet, and a by-pass outlet, a valve having a bleeder opening therethrough disposed within the body between the inlet and by-pass outlet, a second valve disposed within the body between the inlet and said main outlet, said valves being normally biased toward closed position, said first valve opening in response to the attainment of a predetermined differential between the pressures at said inlet and said by-pass outlet, means for opening said second valve in response to a predetermined relationship between the inlet and outlet pressures of the fluid passing through the body, movable means for masking the first named valve and bleeder opening on the inlet side thereof, and means for moving the movable means to a masking position prior to opening of the second named valve.

3. In a fluid flow control device, a hollow body having an inlet, a main outlet, and a by-pass outlet, a pair of independently operable valves within the body disposed between the inlet and the by-pass outlet, and being arranged to open in response to a predetermined relationship between the inlet and by-pass outlet of the fluid flowing through the body, one of said pair of valves having a bleeder opening therethrough, a third valve disposed between the inlet and the main outlet, means for biasing one of said pair of valves closed against fluid pressure to a predetermined degree, means for biasing the other of said pair of valves closed against fluid pressure of a predetermined degree higher than that required to open said one of said pair of valves, means for biasing the third valve to closed position, operating mechanism responsive only to the difference between the inlet and by-pass outlet pressures of fluid entering and leaving the body so as to open the third valve against the closing bias thereof, and means actuated by the operative mechanism for closing the said one of said valves prior to opening of the third valve.

4. In a fluid flow control device, a hollow body having an inlet, a main outlet, and a by-pass outlet, first and second valves in said by-pass outlet and a third valve in said main outlet, the first and second valves being arranged to open in response to a predetermined relationship between the inlet and by-pass outlet pressures of the fluid passing through the body, plural spring means for respectively biasing all of said valves toward closed position and for establishing a pressure differential between said inlet and said outlets, the means for biasing the second valve being of greater strength than the first, further means responsive to fluid pressure in said by-pass outlet for biasing said third valve closed, operating means responsive to the difference between the inlet and by-pass outlet pressures of fluid entering and leaving the body so as to open the third valve against the closing bias thereof when such pressure differential attains a predetermined value, and means actuated by said operating means for closing said first valve prior to opening of said third valve.

5. In a fluid flow device, a hollow body formed to provide a first chamber having an inlet and a main outlet, a second chamber having a by-pass outlet, and a passage between the chambers, a first valve seat in said passage, a first valve engageable with said first seat and adapted to open toward the second chamber in response to the pressure of fluid within the first chamber, a spring biasing the first valve closed so as to establish a pressure differential between the chambers, a second valve seat in said main outlet, a second valve engageable with said second valve seat, spring means normally biasing the second valve closed, means for opening the second valve in response to a predetermined relationship between the inlet and outlet pressures of the fluid passing through the body, a masking valve movable to close the passage on the end thereof towards the first chamber, and movable means connecting the masking valve and said second valve for substantially closing the passage prior to opening of the second valve.

6. In a fluid flow control device, a hollow body formed to provide a first chamber having an inlet and a main outlet, a second chamber having a by-pass outlet, and a passage connecting the chambers, a first valve seat in said passage, a first valve engageable with said first valve seat and adapted to open toward the second chamber in response to the pressure of fluid within the first chamber, said first valve having a bleeder opening therethrough, a spring biasing the first valve closed against pressures to a predetermined degree to establish a pressure differential between said chambers, a second valve seat in said main outlet, a second valve engageable with said second seat, spring means biasing said second valve towards closed position, means for opening the second valve against the biasing means in response to a predetermined relationship between the inlet and by-pass outlet pressures of the fluid passing through the body, a masking valve movable to close the passage on the end thereof towards the first chamber, and means connecting the masking valve and the second valve whereby to substantially close the passage prior to opening of the second valve.

7. In a fluid flow control device, a hollow body formed to provide a first chamber having an inlet and a main outlet, a second chamber having a by-pass outlet, and a passage between the chambers, a first valve seat in said passage, a first valve engageable with said first seat and adapted to open towards the second chamber, the first valve having an opening therethrough and a second valve seat around said opening, a second valve engageable with said second seat and adapted to open towards the second chamber, first and second spring means for respectively biasing said first and second valves toward closed position, the first spring means being of greater strength than the second, said first and second valves opening in response to the attainment of respectively higher and lower fluid pressure differentials between said inlet and said by-pass outlet, a third valve seat in said main outlet, a third valve adapted to engage said third seat, means for biasing the third valve toward closed position, means for opening the third valve against its biasing means in response to a predetermined relationship between the inlet and by-pass outlet pressures of the fluid passing through the body, and means actuated by the operating means for substantially closing the opening through the first valve on the side thereof towards the first chamber prior to opening of the third valve.

8. In a fluid flow control device, a hollow body formed to provide a first chamber having an inlet and a main outlet, a second chamber having a by-pass outlet, and a fluid passage between the chambers, a cylinder disposed within said second chamber, a piston movable in said cylinder, a piston rod extending through said passage and into said main outlet, a valve seat in said passage, an annular valve surrounding said piston rod, said annular valve being engageable with said seat and adapted to open towards the second chamber in response to fluid pressure in the first chamber, the annular valve forming a second valve seat, a second valve slidable on said rod, said second valve being adapted to engage said second valve seat on the first valve to close the annulus thereof and to open towards the second chamber, the first valve forming a third valve seat on the side thereof towards the first chamber, a first spring biasing the first valve closed, a second spring of less strength than the first biasing the second valve closed, a third spring, of a strength intermediate the first and second, biasing the piston and piston rod towards the main outlet, conduit means connecting said second chamber and said cylinder on the side of said piston on which back-pressure from the second chamber biases said cylinder and rod towards the main outlet, second conduit means restricted relative to the first connecting the first chamber and said cylinder on the side of the piston on which pressure from the first chamber biases said piston and piston rod away from the main outlet, a fourth valve seat in said main outlet, a third valve slidable on said rod engageable with said fourth valve seat and opening towards the first chamber, lost motion means connecting the rod and said third valve whereby to hold said third valve closed when said rod is in the extreme position towards the main outlet and to open the third valve by movement towards the other extreme position, a fourth valve slidable on said rod and engageable with the valve seat on said first valve for closing the annulus thereof on the side towards the first chamber upon piston movement prior to opening of the third valve, and other lost motion means connecting the fourth and third valves whereby to close the annulus when said third valve is open.

9. A flow control device for a fluid, the viscosity of which varies in accordance with changes in temperature, including a casing having an inlet, an outlet and a by-pass, all of which are interconnected, a valve normally biased to closed position between the inlet and the outlet, means associated with said valve and effective to create successive predetermined low and high pressure differentials between the inlet and the by-pass, said pressure differentials being substantially constant, and means for opening said valve when the inlet pressure after rising above a predetermined value decreases below said value.

10. A flow control device for a fluid, the viscosity of which varies in accordance with changes in temperature, including a casing having an inlet, an outlet and a by-pass, all of which are interconnected, a valve normally biased to closed position between the inlet and the outlet, means associated with said valve and effective to create successive predetermined low and high pressure differentials between the inlet and the by-pass, and means responsive to the differential pressures in the inlet and in the by-pass to open said valve when the pressure in the inlet after rising above a predetermined value decreases below said value.

11. A flow control device for a fluid, the viscosity of which varies in accordance with changes in temperature, including a casing having an inlet, an outlet and a by-pass, all of which are interconnected, a valve normally biased to closed position between the inlet and the outlet, means associated with said valve and effective to create successive predetermined low and high pressure differentials between the inlet and the by-pass, and means including a piston movable in response to the differential pressures in the inlet and in the by-pass to open said valve when the pressure in the inlet after rising above a predetermined value decreases below said value.

12. A flow control device for a fluid, the viscosity of which varies in accordance with changes in temperature, including a casing having an inlet, an outlet and a by-pass, all of which are interconnected, a valve normally biased to closed position between the inlet and the outlet, and means associated with said valve and effective to create successive predetermined low and high pressure differentials between the inlet and the by-pass, and means responsive to the differential pressures in the inlet and the by-pass and the pressure in the inlet to open said valve when the pressure in the inlet has decreased to less than a predetermined value.

13. A flow control device for a fluid, the viscosity of which varies in accordance with changes in temperature, including a casing having an inlet, an outlet and a by-pass, all of which are interconnected, a valve normally biased to closed position between the inlet and the outlet, and means associated with said valve and effective to create successive predetermined low and high pressure differentials between the inlet and the by-pass, and means responsive to the differential pressures in the inlet and the by-pass to maintain said valve closed until the pressure in the inlet has decreased to less than a predetermined value and then to open said valve.

14. A flow control device for a fluid, the viscosity of which varies in accordance with changes in temperature, including a casing having an inlet, an outlet and a by-pass, all of which are interconnected, a valve normally biased to closed position between the inlet and the outlet, and means associated with said valve and effective to create successive predetermined low and high pressure differentials between the inlet and the by-pass, means providing a continuous relatively low flow from the inlet to the by-pass, and means responsive to the differential pressures in the inlet and in the by-pass to open said valve when the pressure in the inlet has decreased to less than a predetermined value.

15. A flow control device for a fluid, the viscosity of which varies in accordance with changes in temperature, including a casing having an inlet, an outlet and a by-pass, all of which are interconnected, a valve normally biased to closed position between the inlet and the outlet, and means associated with said valve and effective to create successive predetermined low and high pressure differentials between the inlet and the by-pass, means providing a continuous relatively low flow from the inlet to the by-pass, and means including a piston movable in response to the differential pressures in the inlet and in the by-pass to open said valve when the pressure in the inlet has decreased to less than a predetermined value.

16. A flow control device for a fluid, the viscosity of which varies in accordance with changes in temperature, including a casing having an inlet, an outlet and a by-pass, all of which are interconnected, a valve normally biased to closed position between the inlet and the outlet, and means associated with said valve and effective to create successive predetermined low and high pressure differentials between the inlet and the by-pass, and to open said valve when the pressure in the inlet has decreased to less than a predetermined value, said means creating a high differential pressure between the inlet and the by-pass being effective to limit the pressure at the outlet when said valve is open.

17. A flow control device for a fluid, the viscosity of which varies in accordance with changes in temperature, including a casing having an inlet, an outlet and a by-pass, all of which are interconnected, a valve normally biased to closed position between the inlet and the outlet, and means associated with said valve and effective to create successive predetermined low and high pressure differentials between the inlet and the by-pass, a time delay means effective to limit the duration of the low pressure differential between the inlet and the by-pass and to open said valve when the pressure in the inlet has decreased to less than a predetermined value.

18. A fluid flow control device, comprising a casing having an inlet, an outlet and a by-pass, the fluid entering said inlet at a variable pressure and flowing alternatively to said outlet and said by-pass; a valve between said inlet and said outlet and urged by the pressure of the fluid at said inlet to a position closing said outlet; means effective to create a predetermined low pressure differential between said inlet and said by-pass; a pressure fluid operated piston; means for applying said pressure differential across said piston to effect operation of said piston; a connection including lost motion means between said piston and said valve; and means operating in the lost motion period of movement of said piston for initiating establishment of a predetermined high pressure differential between said inlet and said by-pass.

19. A fluid flow control device, comprising a casing having an inlet, an outlet and a by-pass, the fluid entering said inlet at a variable pressure and flowing alternatively to said outlet and said by-pass; a valve between said inlet and said outlet and urged by the pressure of the fluid at said inlet to a position closing said outlet; means effective to create a predetermined low pressure differential between said inlet and said by-pass; means moving in response to the creation of a pressure differential between said inlet and said by-pass for opening said valve, said means exerting a valve opening force which varies in correspondence with variations in said pressure differential; means whereby the initial motion of said movable means is accomplished independently of said valve; and means controlled by said movable means and acting during the independent movement thereof for initiating establishment of a predetermined high differential between said inlet and said by-pass, said movable means being effective to open said valve when the pressure at the inlet rises beyond and then decreases to or below a predetermined value.

20. A fluid flow control device, comprising a casing having an inlet, an outlet and a by-pass, the fluid entering said inlet at a variable pressure and flowing alternatively to said outlet and said by-pass; an outlet control valve between said inlet and said outlet urged by the pressure of the fluid at said inlet to a position closing said outlet; a valve assembly between said inlet and said by-pass, comprising a first valve having a longitudinal opening therethrough and opposed seats surrounding said opening, and further comprising a second valve on the by-pass side of said assembly adapted to seat on said first valve thereby to form a closure cutting off communication between the inlet and the by-pass, said closure being arranged to open in response to a pressure differential between the inlet and the by-pass; separate yielding means resisting opening movement of said first and second valves, the yielding means controlling said second valve being subordinate to the yielding means controlling said first valve; movable means responsive to the pressure difference between said inlet and said by-pass for opening said outlet control valve when such pressure difference and said inlet pressure assume a predetermined relation; means establishing a lost motion period in the operation of said outlet control valve by said movable means; and a third valve in said valve assembly on the inlet side thereof and operable during said lost motion period to close the longitudinal opening through the said first valve of said valve assembly.

HAROLD CRUZAN.
HARRY T. BOOTH.